United States Patent
Cox et al.

(10) Patent No.: US 10,318,658 B2
(45) Date of Patent: Jun. 11, 2019

(54) SYSTEM, METHOD, APPARATUS, AND COMPUTER PROGRAM PRODUCT FOR GENERATION OF AN ELEVATION PLAN FOR A COMPUTING SYSTEM

(71) Applicant: VCE Company, LLC, Richardson, TX (US)

(72) Inventors: Timothy Allen Cox, Bellingham, MA (US); Jeffery Jon Hayward, Lucas, TX (US); Brian Keefe, Westminster, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 933 days.

(21) Appl. No.: 14/460,677

(22) Filed: Aug. 15, 2014

(65) Prior Publication Data
US 2016/0048611 A1     Feb. 18, 2016

(51) Int. Cl.
*G06F 17/50*     (2006.01)

(52) U.S. Cl.
CPC .......... *G06F 17/5004* (2013.01); *G06F 17/50* (2013.01); *G06F 17/5086* (2013.01); *G06F 2217/02* (2013.01); *G06F 2217/06* (2013.01)

(58) Field of Classification Search
None
See application file for complete search history.

(56) References Cited

U.S. PATENT DOCUMENTS

| | | |
|---|---|---|
| 5,850,539 A | 12/1998 | Cook et al. |
| 9,946,814 B1 | 4/2018 | Cox |
| 10,057,138 B1 | 8/2018 | Cox |
| 2004/0088145 A1* | 5/2004 | Rosenthal ............. G06F 17/509 703/1 |
| 2005/0182601 A1 | 8/2005 | Deguchi |
| 2014/0258238 A1* | 9/2014 | Jin ...................... G06F 9/45558 707/649 |
| 2015/0324487 A1* | 11/2015 | Lee ......................... G06F 17/50 703/21 |

FOREIGN PATENT DOCUMENTS

EP     2498193     9/2012

OTHER PUBLICATIONS

International Search Report and the Written Opinion of the International Searching Authority, PCT/US2015/043253, dated Oct. 30, 2015.

* cited by examiner

*Primary Examiner* — Craig C Dorais
(74) *Attorney, Agent, or Firm* — Womble Bond Dickinson (US) LLP

(57) ABSTRACT

A system, method, apparatus, and computer program product for generating an elevation plan for a computing system are disclosed. A method may include accessing a build specification identifying components to be included in the computing system. The method may also include accessing a set of component placement rules defining rules for placing components within a rack. The method may further include generating an elevation plan defining a respective mount position for each of a subset of the components within one or more racks based on the set of component placement rules.

20 Claims, 10 Drawing Sheets

| DIMENSIONS | | MAXIMUM PLACEMENT (RU) | MAXIMUM STACK | MAXIMUM QTY | SPLIT WHERE POSSIBLE | CABINET TYPE | STACKING PRIORITY | VERTICAL BUILD DIRECTION | HORIZONTAL BUILD DIRECTION FRONT VIEW |
|---|---|---|---|---|---|---|---|---|---|
| RU | DEPTH (in) | | | | | | | | |
| 21 | 38 | 10 | 1 | 1 | YES | NETWORK | | | |
| 14 | 34 | NONE | 2 | 2 | YES | NETWORK | | | |
| 2 | 29.5 | NONE | NONE | 2 | YES | SERVER | 50 | UP | RIGHT |
| 1 | 30 | NONE | NONE | | YES | SERVER | 60 | UP | RIGHT |
| 2 | 20 | NONE | 2 | | YES | BOTH | 40 | DOWN | RIGHT |
| 3 | 24 | NONE | 2 | | YES | BOTH | 40 | DOWN | RIGHT |
| 1 | 28.5 | NONE | 4 | | YES | BOTH | 30 | UP | RIGHT |
| 2 | 28 | NONE | 4 | | YES | BOTH | 30 | UP | RIGHT |

FIG. 4b

| CAB SN | 1 | | CAB SN | 2 | |
|---|---|---|---|---|---|
| RU42 | PATCH PANEL (R) A | | RU42 | PATCH PANEL (R) B | |
| RU41 | | | RU41 | | |
| RU40 | | | RU40 | | |
| RU39 | | | RU39 | | |
| RU38 | | | RU38 | | |
| RU37 | 3048 A | | RU37 | 3048 B | |
| RU36 | | | RU36 | | |
| RU35 | AMP-2 C220 A | | RU35 | AMP-2 C220 B | |
| RU34 | | | RU34 | | |
| RU33 | | | RU33 | | |
| RU32 | 5548 I | | RU32 | 5548 J | |
| RU31 | 5548 G | | RU31 | 5548 H | |
| RU30 | 2U PASSTHROUGH | | RU30 | 2U PASSTHROUGH | |
| RU29 | | | RU29 | | |
| RU28 | 5548 E | | RU28 | 5548 F | |
| RU27 | 5548 C | | RU27 | 5548 D | |
| RU26 | | | RU26 | | |
| RU25 | | | RU25 | | |
| RU24 | | | RU24 | | |
| RU23 | | | RU23 | | |
| RU22 | | | RU22 | | |
| RU21 | | | RU21 | | |
| RU20 | | | RU20 | | |
| RU19 | | | RU19 | | |
| RU18 | | | RU18 | | |
| RU17 | 2U PASSTHROUGH | | RU17 | 2U PASSTHROUGH | |
| RU16 | | | RU16 | | |
| RU15 | 6296 A | | RU15 | 6296 B | |
| RU14 | | | RU14 | | |
| RU13 | | | RU13 | | |
| RU12 | | | RU12 | | |
| RU11 | | | RU11 | | |
| RU10 | 5108 C | | RU10 | 5108 D | |
| RU9 | | | RU9 | | |
| RU8 | | | RU8 | | |
| RU7 | | | RU7 | | |
| RU6 | | | RU6 | | |
| RU5 | | | RU5 | | |
| RU4 | 5108 A | | RU4 | 5108 B | |
| RU3 | | | RU3 | | |
| RU2 | | | RU2 | | |
| RU1 | | | RU1 | | |

| | | 3 | | |
|---|---|---|---|---|
| | CAB SN | | | |
| | RU42 | PATCH PANEL (R) D | //// | |
| | RU41 | //// | //// | |
| | RU40 | //// | //// | |
| | RU39 | //// | //// | |
| | RU38 | //// | //// | |
| | RU37 | RPA 7 | | |
| | RU36 | RPA 5 | | |
| | RU35 | RPA 3 | | |
| | RU34 | RPA 1 | | |
| | RU33 | 9148 A | | |
| | RU32 | | | |
| | RU31 | //// | //// | |
| | RU30 | DAE 7 0 | | |
| | RU29 | | | |
| | RU28 | DAE 6 0 | | |
| | RU27 | | | |
| | RU26 | DAE 5 0 | | |
| | RU25 | | | |
| | RU24 | DAE 4 0 | | |
| | RU23 | | | |
| | RU22 | DAE 3 0 | | |
| | RU21 | | | |
| | RU20 | DAE 2 0 | | |
| | RU19 | | | |
| | RU18 | DAE 1 0 | | |
| | RU17 | | | |
| | RU16 | DAE 0 0 | | |
| | RU15 | | | |
| | RU14 | DM 1 | //// | |
| | RU13 | | //// | |
| | RU12 | DM 0 | //// | |
| | RU11 | | //// | |
| | RU10 | CS 1 | //// | |
| | RU9 | CS 0 | //// | |
| | RU8 | | | |
| | RU7 | SP | | |
| | RU6 | | | |
| | RU5 | | | |
| | RU4 | SPS 1 | //// | |
| | RU3 | | //// | |
| | RU2 | SPS 0 | //// | |
| | RU1 | | //// | |

FIG. 5b

SYSTEM, METHOD, APPARATUS, AND COMPUTER PROGRAM PRODUCT FOR GENERATION OF AN ELEVATION PLAN FOR A COMPUTING SYSTEM

FIELD OF THE DISCLOSURE

Aspects of the disclosure relate to computing system design and, more particularly, to a system, method, apparatus, and computer program product for generating an elevation plan for a computing system.

BACKGROUND

Converged infrastructure computing is rapidly gaining in popularity, as more and more entities deploying IT platforms are choosing to deploy converged infrastructure systems as part of an integrated information technology (IT) solution. In this regard, converged infrastructure packages multiple IT components, such as servers, data storage devices, networking equipment, and software for IT infrastructure management into a single, optimized computing solution. The integrated solution provided by a converged infrastructure can reduce complexity of deployment, increase IT infrastructure reliability, and reduce management costs compared to conventional IP platforms assembled from individually acquired and assembled components and software packages, as converged infrastructure can provide an integrated set of components selected and assembled by a single vendor into an integrated platform providing guaranteed component interoperability and software compliance. Moreover, converged infrastructure can provide an integrated pool of computing, storage, and networking resources (e.g., a cloud-based computing model) that can be shared by multiple applications and/or users.

However, given the diverse mix of components included in converged infrastructure computing systems, design specification for component placement within one or more racks that can be used to house the components of a converged infrastructure can be complex. As the set of components included in converged infrastructures and other computing systems including a mix of components is often customized specifically for a given customer's needs, the burden of system design is generally incurred for each individual computer system such that there is little reduction in design burden through economies of scale. Moreover, once a design specification has been completed, there is a need to generate documentation usable by individuals tasked with building a computing system in accordance with the design specification (e.g., contract integrators) to complete the system build in accordance with the design specification.

SUMMARY

A system, method, apparatus, and computer program product for generating an elevation plan for a computing system, such as a converged infrastructure, are disclosed. Some embodiments disclosed herein provide for automatic generation of an elevation plan based on a build specification identifying components to be included in the computing system and a set of component placement rules defining rules for placing components within a rack. Accordingly, such embodiments can automate and reduce the burden of aspects of design specification and documentation generation for converged infrastructures and other computing systems. For example, a method in accordance with some embodiments may include accessing a build specification identifying components to be included in the computing system. The method may also include accessing a set of component placement rules defining rules for placing components within a rack. The method may further include generating an elevation plan defining a respective mount position for each of a subset of the components within one or more racks based on the set of component placement rules. In accordance with some example embodiments, the elevation plan may be automatically generated without human intervention in accordance with the method.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
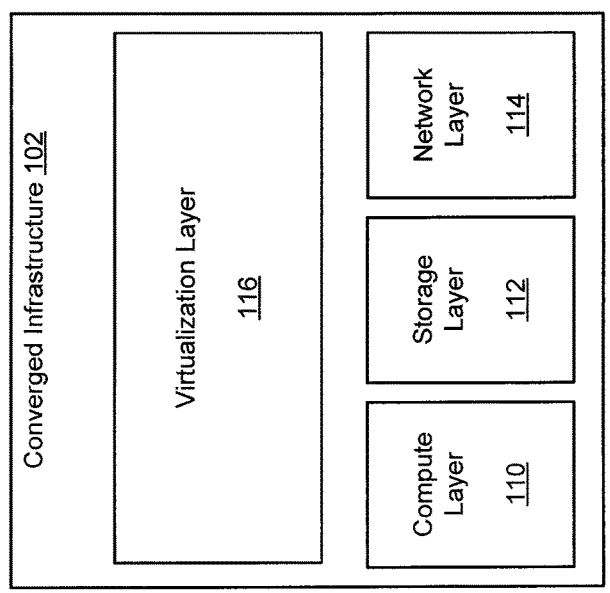
Figure 2:
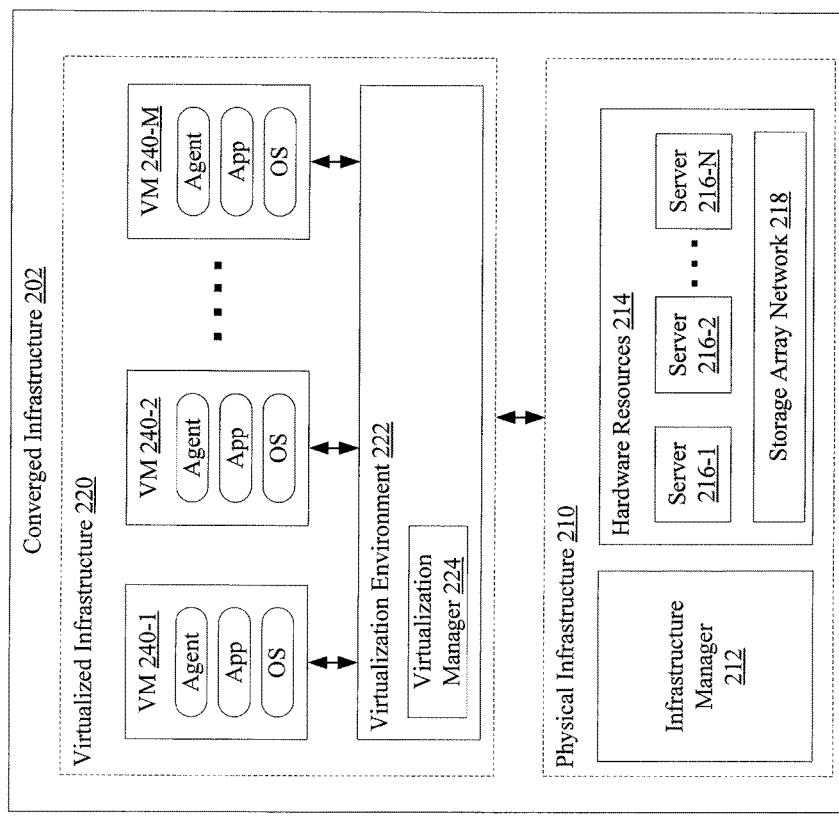
Figure 3:
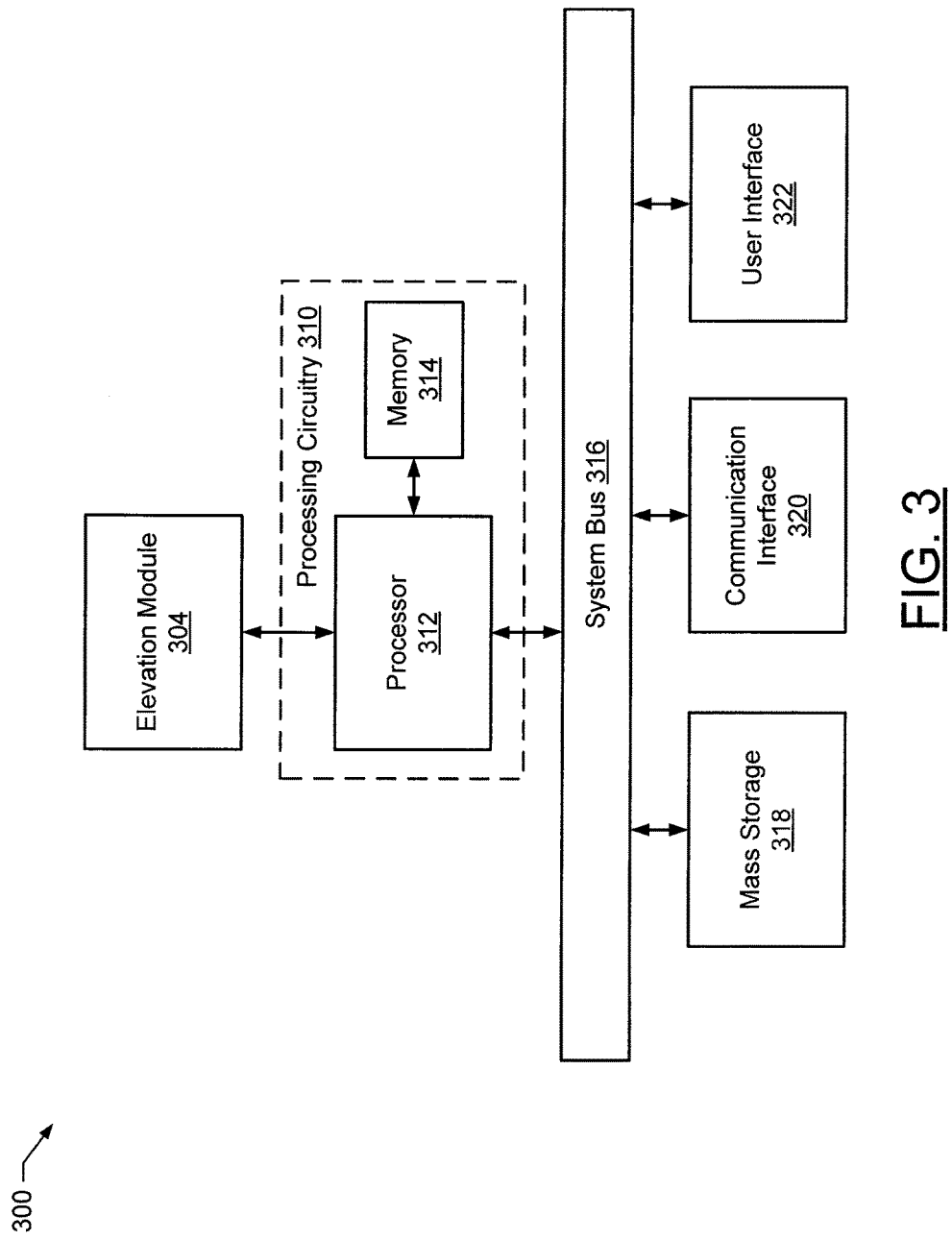
Figure 4A:
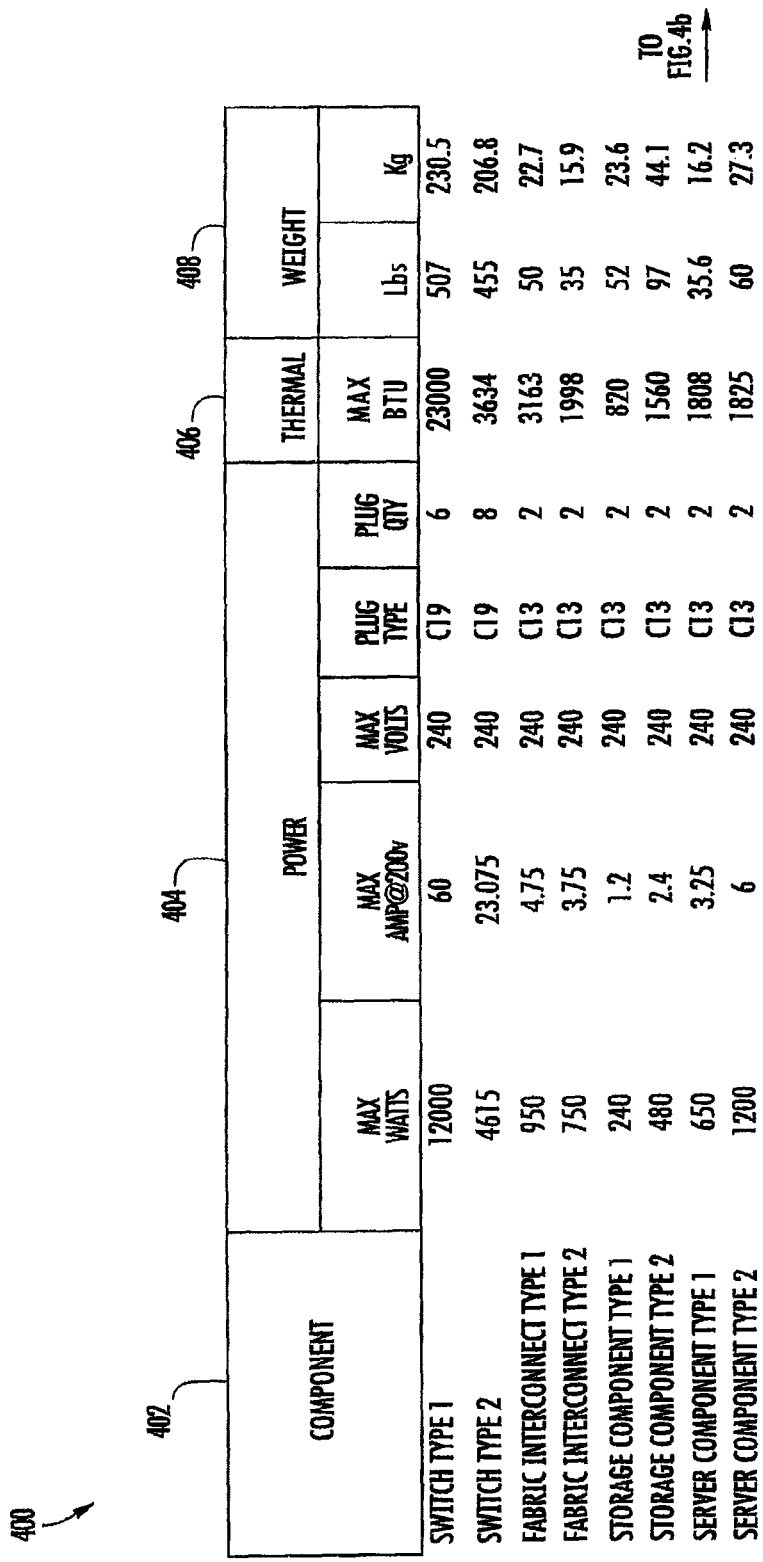
Figure 6:
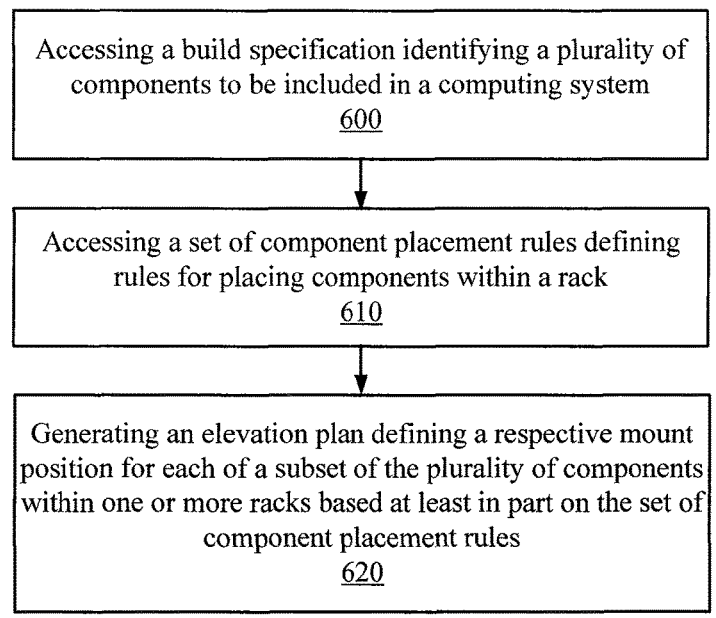
Figure 7:
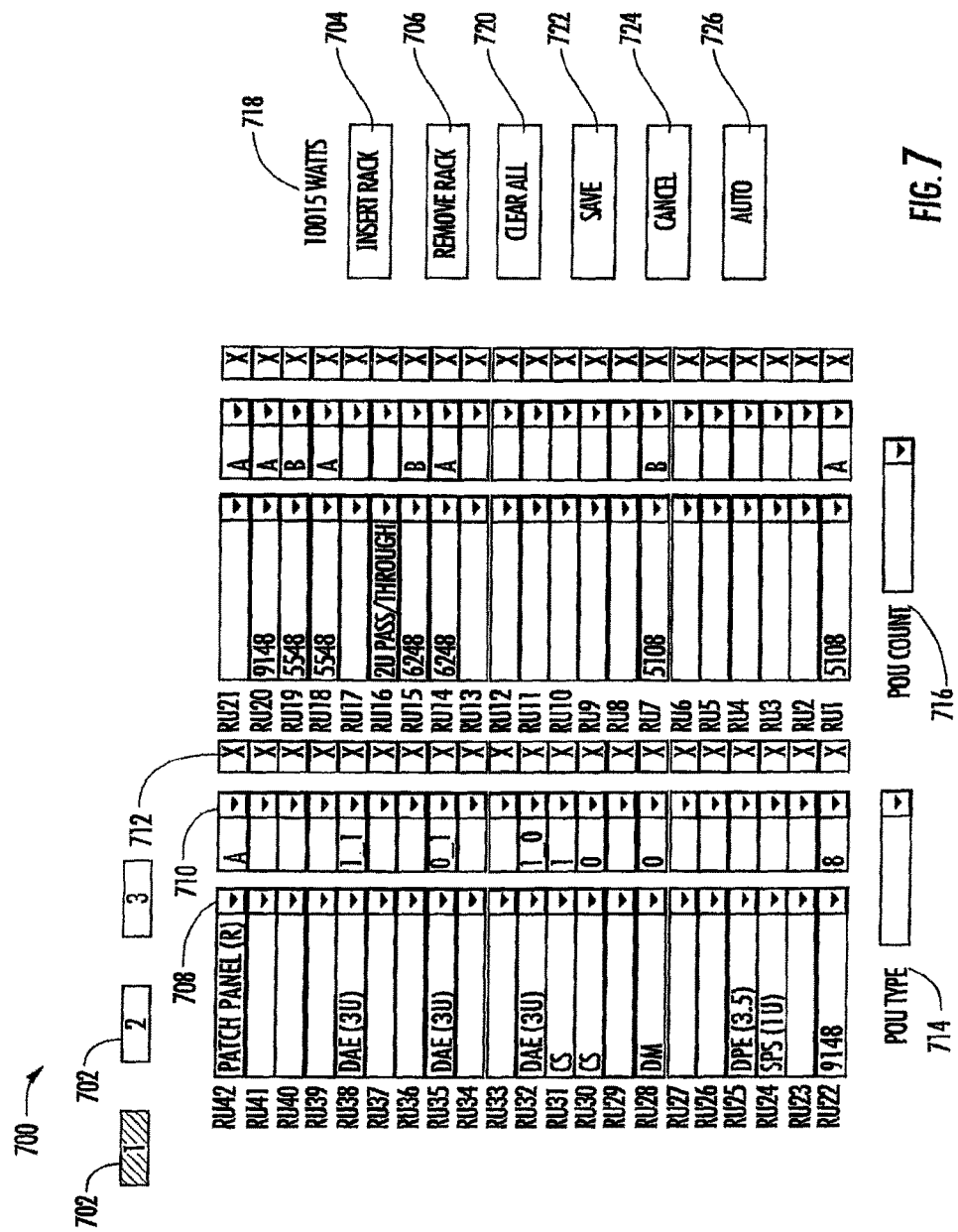
Figure 8:
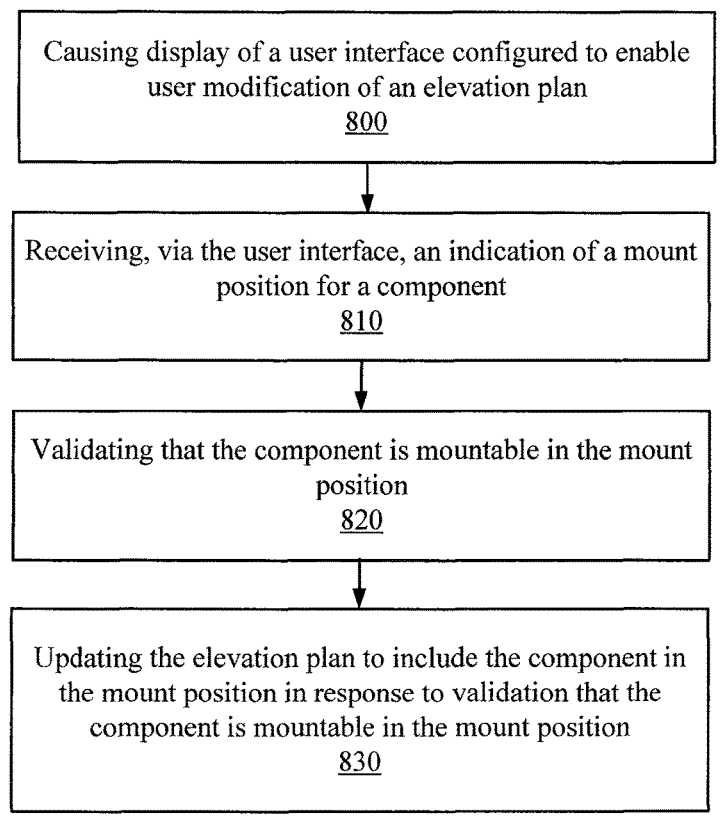

Having thus described the disclosure in general terms, reference will now be made to the accompanying drawings, which are not necessarily drawn to scale, and wherein:

FIG. 1 illustrates a block diagram of an architecture of an example converged infrastructure in accordance with some example embodiments;

FIG. 2 illustrates a block diagram of an architecture of another example converged infrastructure in accordance with some example embodiments;

FIG. 3 illustrates a block diagram of an example computing system that may be configured to support elevation plan generation in accordance with some example embodiments;

FIGS. 4*a* and 4*b* illustrate an example modularity table defining component placement rules that may be used for generating an elevation plan in accordance with some example embodiments;

FIGS. 5*a* and 5*b* illustrate an example elevation plan that may be generated in accordance with some example embodiments;

FIG. 6 illustrates a flowchart according to an example method for generating an elevation plan for a computing system in accordance with some example embodiments;

FIG. 7 illustrates an example user interface for modifying an elevation plan that may be provided in accordance with some example embodiments; and FIG. 8 illustrates a flowchart according to an example method for validating a user modification to an elevation plan in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Embodiments disclosed herein relate to the generation of an elevation plan for a computing system such as a converged infrastructure that includes a plurality of components mounted in one or more racks (e.g., a rack mounted computing system). An elevation plan that may be generated in accordance with various example embodiments may define component mount positions within one or more racks. For example, a rack may be divided into a plurality of mount positions (e.g., rack units), and the elevation plan may indicate the mount positions of a rack that are occupied by a component and which component occupies the mount position. The elevation plan may be used by an individual, such as a contract integrator, as a design plan for building the computer system. Additionally, an owner or other operator of a computing system built in accordance with the elevation plan may use the elevation plan as documentation indicative of the components included in the computing system and the placement thereof within the rack(s) housing the system components.

Some example embodiments disclosed herein provide for automatic generation of an elevation plan based on a build specification identifying components to be included in the computing system and a set of component placement rules defining rules for placing components within a rack. Accordingly, such embodiments can automate and reduce the burden of aspects of design specification and documentation generation for converged infrastructures and other computing systems.

Further, some example embodiments disclosed herein provide a user interface enabling user modification of an elevation plan for a computing system. The user interface may enable a user to design and modify an elevation plan for a computing system by selecting a mount position for a component, thereby enabling the user to select and manipulate mount positions for components within a rack. Some such embodiments validate that a user selected mount position for a component complies with one or more component placement rules, thereby ensuring that manual designs and edits to designs comply with the component placement rules.

FIG. 1 illustrates a block diagram of an architecture of an example converged infrastructure 102 in accordance with some example embodiments. In this regard, FIG. 1 illustrates an example converged infrastructure for which an elevation plan may be generated and/or modified in accordance with various example embodiments. While some example embodiments are illustrated and described with respect to the generation and/or modification of an elevation plan for a converged infrastructure, it will be appreciated that various example embodiments may be applied to the generation and/or modification of an elevation plan for any type of computing system including a plurality of components housed within one or more racks. As such, it will be appreciated that the example embodiments and associated techniques described herein with respect to the generation and editing of converged infrastructures may be applied mutatis mutandis to other computing systems that can include a plurality of components that can be housed within one or more racks.

The converged infrastructure 102 may include a plurality of components, such as servers, data storage devices, network equipment, and associated software, which may collectively form the converged infrastructure 102. By way of non-limiting example, in some embodiments, the converged infrastructure 102 may be implemented by a Vblock™ System available from the VCE Company, LLC of Richardson, Tex. Some example embodiments provide for the generation and/or modification of an elevation plan specifying mount positions within one or more racks for the components of the converged infrastructure 102.

The converged infrastructure 102 of some embodiments may include one or more compute layer 110 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 102 may further include one or more storage layer 112 components, such as one or more storage arrays and/or other mass storage devices that may be implemented on a converged infrastructure. In some embodiments, the converged infrastructure 102 may additionally include one or more network layer 114 components, such as one or more switches and/or other network layer components that may be implemented on a converged infrastructure. For example, the network layer 114 may include components that provide switching and routing between the compute layer 110 and storage layer 112 within the converged infrastructure 102. The network layer 114 may additionally or alternatively include components that provide switching and routing between the converged infrastructure 102 and a network so as to support network communication between a component(s) of the converged infrastructure 102 and a computing platform(s) independent of the converged infrastructure 102. The components of the compute layer 110, storage layer 112, and network layer 114 may collectively provide a physical infrastructure of the converged infrastructure 102.

The converged infrastructure 102 may additionally include a virtualization layer 116, which may include one or more virtualization components configured to support one or more virtualized computing environments. The components of the virtualization layer 116 may include components embodied in software, hardware, firmware, and/or some combination thereof. For example, the virtualization layer 116 may include a hypervisor and/or other virtualization components that may be configured to create and run virtual machines and/or to otherwise virtually simulate a computing environment. In some example embodiments, the virtualization layer 116 may include and/or may be communicatively coupled with one or more management components configured to support management of the converged infrastructure 102. For example, in some embodiments, the virtualization layer 116 may include a management infrastructure, which may provide management resources for managing the converged infrastructure 102. In some such embodiments, the management infrastructure may be separate system from the converged infrastructure, but may be connected to the converged infrastructure to allow management of the entire converged infrastructure 102. In some example embodiments, the virtualization layer 116 may utilize physical hardware resources of the compute layer 110, storage layer 112, and/or network layer 114 to support operation of one or more components of the virtualization layer 116. Additionally or alternatively, in some example embodiments, the virtualization layer 116 may include dedicated physical resources (e.g., physical hardware components) that may provide computing, storage, and/or network communication resources to one or more components of the virtualization layer 116.

It will be appreciated that the compute layer 110, storage layer 112, network layer 114, and virtualization layer 116 as illustrated in FIG. 1 and described above are provided by way of example, and not by way of limitation. In this regard, in some embodiments, aspects of the compute layer 110, storage layer 112, network layer 114, and virtualization layer 116 as described above may not be mandatory and thus some may be omitted in certain embodiments. Additionally, the converged infrastructure 102 of some embodiments may include further or different layers and/or components beyond those illustrated in and described with respect to FIG. 1. A block diagram of an example converged infrastructure architecture that may be implemented by the converged infrastructure 102 of some example embodiments is illustrated in and described below with respect to FIG. 2.

Physical components of the converged infrastructure 102 may be communicatively coupled with each other to support operation of the converged infrastructure 102 via direct connection and/or network communication. For example, as discussed above, in some example embodiments, the network layer 114 may provide switching and routing between physical components of the converged infrastructure.

In some embodiments at least a portion of the components of the converged infrastructure 102 may be assigned addresses, such as Internet Protocol (IP) addresses and/or other network layer addresses, via which the components may be accessed by another component internal to the converged infrastructure 102 and/or via a computing device external to the converged infrastructure 102. For example, in some example embodiments, the converged infrastructure 102 and/or one or more network addressable components thereof may be accessed by an external computing device over a network to which the converged infrastructure 102 of some embodiments may be connected.

FIG. 2 illustrates a block diagram of an architecture of another example converged infrastructure 202 in accordance with some example embodiments. The converged infrastructure 202 may, for example, be an embodiment of the converged infrastructure 102 in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2. Some example embodiments provide for the generation and/or modification of an elevation plan specifying mount positions within one or more racks for the components of the converged infrastructure 202.

The converged infrastructure 202 may include a physical infrastructure 210 configured to support a virtualized infrastructure 220. In some example embodiments, the physical infrastructure 210 may include hardware resources 214, such as servers 216-1 to 216-N (sometimes referred to as "hosts") and one or more storage array networks (SAN), such as SAN 218, which may be communicatively connected by a network (not shown). The physical infrastructure 210, including hardware resources 214 may, for example, provide an embodiment of the compute layer 110, storage layer 112, and network layer 114. For example, the servers 216 may comprise an implementation of the compute layer 110, and the SAN 218 may comprise an implementation of the storage layer 112. The hardware resources 214, including, for example, the servers 216 and SAN 218 may be communicatively connected by an embodiment of the network layer 114.

In some example embodiments, the physical infrastructure 210 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 210. One such example of physical infrastructure 210 is a Vblock System available from the VCE Company, LLC.

The physical infrastructure 210 may further include an infrastructure manager 212 configured to manage the configuration, provisioning, and policy compliance of the physical infrastructure 210. Infrastructure manager 212 may be configured to provide an interface by which provisioning of hardware resources 214 (e.g., computing, networking, storage) may be managed with policy-based automation. According to some embodiments, the infrastructure manager 212 may be included in every physical infrastructure 210 to manage the configuration, provisioning, and compliance of computing-block based infrastructure. As described in further detail below, the virtualized infrastructure 220 (or component thereof) of some example embodiments may be configured to connect to and communicate with the infrastructure manager 212 to manage and/or configure the physical infrastructure 210 to support operation of components of the virtualized infrastructure 220. One example of an infrastructure manager 212 includes EMC Ionix Unified Infrastructure Manager (UIM) available from EMC Corporation. In some embodiments, the infrastructure manager 212 may further be configured to provide network manager functionality such that the infrastructure manager 212 may be configured to configure network devices (e.g., switches, routers) and manage addressing, subnets, virtual local area networks (VLANs), and/or other network configurations that may be implemented on the converged infrastructure 202. One example of a network manager that may be included on the infrastructure manager 212 of such embodiments is a Cisco Switch, such as may be accessible via a Cisco command line interface (CLI), available from. Cisco System, Inc.

The virtualized infrastructure 220 may include a virtualization environment 222 comprising one or more virtual machines (VM) 240, such as VM 240-1 to VM 240-M. Each virtual machine 240 can have an operating system (OS), one or more applications (APP) and an agent (AGENT). In some embodiments, one or more of the virtual machines 340 may be configured to connect to one or more users by a communications network, such as the Internet. The virtualized infrastructure 220 may, for example, comprise an embodiment of at least a portion of the virtualization layer 116.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 202 of some example embodiments may be configured to perform physical-to-virtual conversion of hardware resources 214 and/or other physical computing of the physical infrastructure 210 to support or host virtual machines 240 in the virtualized infrastructure 220. In this regard, components of the physical infrastructure 210 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 212 to manage and/or configure the physical infrastructure 210 to support operation of the virtual machines 240. The virtualization manager 224 of some example embodiments may be implemented with the VMware vCenter virtualized management platform available from VMware, Inc., of Palo Alto, Calif.

In some example embodiments, virtualization environment 222 may be implemented by running VMware vSphere® and/or VMware ESX® based hypervisor technologies, available from VMware, Inc., on servers 216. However, it will be appreciated that any virtualization/hypervisor technology may be used in addition to or in lieu of VMware hypervisor technologies in accordance with various example embodiments.

FIG. 3 illustrates a block diagram of an example computing system 300 that may be configured to support elevation plan generation in accordance with some example embodiments. The computing system 300 may be implemented on any computing device or plurality of computing devices that may be configured to implement one or more example embodiments. By way of non-limiting example, in some embodiments, the computing system 300 may be implemented on a personal computer (e.g., a desktop computer, laptop computer, or the like), a mobile computing device (e.g., a smart phone, tablet computer, personal digital assistant, or the like), on a server(s) that can be accessed over a network by another computing device, some combination thereof, or the like.

The computing system 300 may include a plurality of elements, such as elevation module 304, processing circuitry 310, mass storage 318, communication interface 320, and user interface 322, which may be interfaced via a system bus 316. It will be appreciated that the components, devices or elements illustrated in and described with respect to FIG. 3 below may not be mandatory and thus some may be omitted in certain embodiments. Additionally, the computing system 300 of some embodiments may include further or different components, devices or elements beyond those illustrated in and described with respect to FIG. 3.

Further, while FIG. 3 illustrates an architecture including elements interfaced via the system bus 316, it will be appreciated that in some example embodiments, elements of the computing system 300 may be implemented in a distributed computing environment in which elements may be distributed across a plurality of computing devices, which may be in communication with each other, such as via a network, to provide functionality of the computing system 300. As such, in some example embodiments, a subset of the elements of the computing system 300 may be communicatively coupled via a network in addition to or in lieu of the system bus 316.

The computing system 300 of some example embodiments may implement an operating system(s), such as MS-WINDOWS™, MACINTOSH OS X™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, GOOGLE ANDROID™, APPLE IOS™, or other known operating systems. It should be appreciated, however, that in some embodiments, one or more aspects of the computing system 300 may be implemented on and/or integrated with a virtualized computing system, such as may be provided by a converged infrastructure (e.g., the converged infrastructure 102 and/or converged infrastructure 202).

In some example embodiments, the computing system 300 may include processing circuitry 310 that is configurable to perform actions in accordance with one or more example embodiments disclosed herein. In this regard, the processing circuitry 310 may be configured to perform and/or control performance of one or more functionalities for generating an elevation plan and/or facilitating user modification of an elevation plan in accordance with various example embodiments. Thus, the processing circuitry 310 may be configured to perform data processing, application execution and/or other processing and management services according to one or more example embodiments.

In some example embodiments, the processing circuitry 310 may include a processor 312 and, in some embodiments, such as that illustrated in FIG. 3, may further include memory 314. The processing circuitry 310 may be in communication with (e.g., via system bus 316) and/or otherwise control the elevation module 304, mass storage 318, communication interface 320, and/or user interface 322.

The processor 312 may be embodied in a variety of forms. For example, the processor 312 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 312 may comprise a plurality of processors. The plurality of processors may be in operative communication with each other and may be collectively configured to perform one or more functionalities in accordance with various embodiments. In some embodiments in which the computing system 300 is embodied as a plurality of computing devices, a plurality of processors, which may collectively form the processor 312, may be distributed across a plurality of computing devices that may be in operative communication with each other directly and/or via a network. In some example embodiments, the processor 312 may be configured to execute instructions that may be stored in a memory, such as the memory 314 and/or the mass storage 318 and/or that may be otherwise accessible to the processor 312. As such, whether configured by hardware or by a combination of hardware and software, the processor 312 may be capable of performing operations according to various embodiments while configured accordingly.

In embodiments including the memory 314, the memory 314 may include read only memory (ROM), random access memory (RAM), and/or the like. The mass storage 318 may include one or more memory and/or other storage devices, which may include fixed (e.g., a fixed hard disc drive, storage array, fixed flash memory device, and/or the like) and/or removable memory devices (e.g., a floppy disc drive, a removable flash memory device, an optical disc drive, and/or other removable memory device). The mass storage 318 may provide a persistent data storage device. In some example embodiments, the mass storage 318 may be configured to provide a backup storage. The mass storage 318 may include a memory device implemented locally to the computing system 300 and/or a memory device remote to the computing system 300, which may be communicatively coupled with the computing system 300, such as via a network. In some embodiments in which the computing system 300 is embodied as a plurality of computing devices, the memory 314 and/or mass storage 318 may include a plurality of memory devices, which may be distributed across a plurality of computing devices that may be in operative communication with each other directly and/or via a network to form the computing system 300.

In some embodiments, the memory 314 and/or the mass storage 318 may provide a non-transitory computer-readable storage medium that may store computer program instructions that may be executed by the processor 312. In this regard, the memory 314 and/or mass storage 318 may be configured to store information, data, applications, instructions and/or the like for enabling the computing system 300 to carry out various functions in accordance with one or more example embodiments. Applications that may be executed by the processor 312 may also be in the form of modulated electronic signals that may be accessed via a network modem or other network interface of the computing system 300.

The computing system 300 may further include a communication interface 320. The communication interface 320 may enable the computing system 300 to communicate (e.g., over a network or other communication interface) with another computing device or system. In this regard, the communication interface 320 may include one or more interface mechanisms for enabling communication with other devices and/or networks. As such, the communication interface 320 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 300 may include the user interface 322. It will be appreciated, however, that in some example embodiments, one or more aspects of the user interface 322 may be omitted, and in some embodiments, the user interface 322 may be omitted entirely. The user interface 322 may be in communication with the processing circuitry 310 to receive an indication of a user input and/or to provide an audible, visual, mechanical, or other output to a user. As such, the user interface 322 may include, for example, a keyboard, a mouse, a joystick, a display, a touch screen display, a microphone, a speaker, one or more biometric input devices, and/or other input/output mechanisms.

In some embodiments including the user interface 322, the user interface 322 may be provided entirely by the computing system 300. Alternatively, in some example embodiments, aspects of the user interface 322 may be implemented by a computing device that may be in communication with the computing system 300. For example, in some embodiments in which the computing system 300 includes a server(s) providing software, a virtualized computing environment, and/or the like that can be accessed by another computing device (e.g., a mobile computing device, personal computing device, and/or the like) over a network, input/output interface mechanisms that may be used by a user to support generation and/or modification of an elevation plan in accordance with various embodiments may be provided by the computing device used to access the computing system 300.

In embodiments including a user interface 322, the user interface 322 may be configured to enable a user to interact with a graphical user interface that can be used to support the generation and/or modification of an elevation plan in accordance with various example embodiments. For example, a display, touch screen display, and/or other output device of the user interface 322 may be configured to provide for display of the graphical user interface. As a further example, an input mechanism, such as a keyboard, touch screen display, microphone, biometric input device, and/or other input mechanism may enable a user to enter commands and/or other input for enabling automatic generation of an elevation plan and/or or to manually create/modify an elevation plan in accordance with various example embodiments.

The computing system 300 may further include the elevation module 304. The elevation module 304 may be embodied as various means, such as circuitry, hardware, a computer program product comprising a computer readable medium (for example, the memory 314 and/or mass storage 318) storing computer readable program instructions executable by a processing device (for example, the processor 312), or some combination thereof. In some embodiments, the processor 312 (or the processing circuitry 310) may include, or otherwise control the elevation module 304. For example, in some embodiments, the processor 312 may be configured to perform functionality of the elevation module 304 (through execution of instructions that may be stored on and/or otherwise loaded onto the memory 314 and/or the mass storage 318.

The elevation module 304 of some example embodiments may be configured to generate an elevation plan for a computing system, such as a converged infrastructure (e.g., the converged infrastructure 102, the converged infrastructure 202, and/or the like). In this regard, the elevation module 304 may be configured to generate an elevation plan defining a respective mount position for each of a subset of components to be included in the computing system based at least in part on a set of component placement rule defining rules for placing components within a rack as further described herein below.

A rack that may be used to house components of a computing system can be any rack, such as a closed cabinet rack (e.g., a rack enclosure or cabinet), an open frame rack, or other structure comprising a plurality of mount positions (e.g., slots, mounts, and/or mechanism that can be used to support a component in a mount position on a rack). Each mount position may have a uniform vertical dimension. For example, in some embodiments, a mount position may be defined as a rack unit (RU) of space, which may, for example, have a vertical height of 1.75 inches (44.45 millimeters). It will be appreciated, however, that other dimensions that may be used for mount positions within a rack are contemplated within the scope of the disclosure.

Various example embodiments may be used to generate elevation plans for computing systems using any of a variety of rack sizes and/or combinations of racks using varying sizes. By way of non-limiting example, racks having 42 mount positions (e.g., 42 RUs of vertical racking space) may be used in some example embodiments. However, it will be appreciated that racks having other dimensions are contemplated within the scope of the disclosure and examples described herein with respect to racks having 42 mount positions are provided by way of example and not by way of limitation. The elevation module 304 may be configured to take into account the size of the rack(s) being used to house components of a computing system when generating an elevation plan and/or validating a modification to an elevation plan in accordance with various example embodiments.

A component may be mounted in a mount position of a rack. An elevation plan in accordance with various example embodiments may specify a mount position in which a component is to be mounted. A vertical dimension of a component may require one or more mount positions (e.g., rack units) of space within a rack such that a component defined to be mounted in a given mount position may occupy multiple mount positions within a rack. The elevation plan may accordingly indicate the mount position(s) within a rack that are occupied by a given component.

In some example embodiments, a user may specify the number of racks to be used for housing the components of a computing system. The user may further specify the size(s) of racks (e.g., in terms of the number of mount positions) to be used. In such example embodiments, the elevation module 304 may be configured to determine and assign mount positions for the components of the computing system across the user specified number of racks based at least in part on a set of component placement rules as described further herein below.

Additionally or alternatively, in some example embodiments, the elevation module 304 may be configured to determine the number of racks (e.g., the minimum number of racks) needed to house the components of the computing system. The elevation module 304 may be configured to make this determination based at least in part on the quantity and dimensions of components to be included in the computing system and the capacity (or capacities) of racks to be used to house the components. In this regard the elevation module 304 may be configured to determine the total number of mount positions needed to accommodate components to be included in the computing system, and may then determine the number of racks needed to provide that number of mount positions. In some example embodiments, component placement rules, such as described further herein below, that may restrict placement of components within racks may also be considered by the elevation module 304 to determine the number of racks needed to house the components of a computing system, as the component placement rules may prevent the usage of some mount positions within a rack such that the amount of rack space needed for the components of the computing system may be greater than the minimum amount of rack space needed to accommodate the cumulative physical dimensions of the components.

The set of components to be included in the computing system may be specified in a build specification identifying components to be included in the computing system. In this regard, the build specification may indicate the types of components to be included in the computing system and respective quantities of each component type. The build specification may be defined in a list or other format that may be used to indicate the components to be included in the computing system and that may be interpreted by the elevation module 304.

In some example embodiments, the build specification may be defined in a file that may be provided to the elevation module 304. For example, the elevation module 304 of some example embodiments may be configured to provide a graphical and/or command line user interface enabling a user to upload a file and/or indicate a file storage location for a file containing the build specification. A user may accordingly upload a file and/or indicate a file storage location via the graphical user interface (e.g., via an element of user interface 322), and the elevation module 304 may access the file containing the build specification. The elevation module 304 may be further configured to parse and/or otherwise process the file to determine the build specification for the computing system. In embodiments in which the build specification may be defined in a file, any appropriate file type may be used. For example, in various embodiments, a build specification may be defined in a document file, a spreadsheet file, a text file, and/or other file type.

Additionally or alternatively in some example embodiments, at least a portion of the build specification may be provided to the elevation module 304 by a user on a component-by-component basis. For example, in some embodiments the elevation module 304 may be configured to provide a graphical and/or command line user interface enabling a user to specify the components to be included in a computing system. For example, in some such embodiments, a user may enter an indication of each component type and/or quantity thereof to be included in the computing system. As another example, in some such embodiments, the elevation module 304 may be configured to provide a graphical user interface having a master list comprising a plurality of available components that may be included in a computing system, and the user may be able to select components and/or quantities thereof from the components in the master list.

The elevation module 304 may be further configured to access the set of component placement rules to be applied for generating the elevation plan. In some example embodiments, at least a portion of the set of component placement rules may be locally stored, such as on the memory 314 and/or mass storage 318. Additionally or alternatively, in some example embodiments, at least a portion of the set of component placement rules may be remotely stored, and may be accessed by the elevation module 304 over a network.

The set of component placement rules may define a set of one or more component placement rules for each of a plurality of component types. The component types may, for example, be specified by component category (e.g., switch, storage array, server, power distribution unit, and/or the like), manufacturer, model number, some combination thereof, or the like. The set of component placement rules may be maintained in a data structure configured to define an association between a component type and a respective set of one or more component placement rules for the component type. The data structure including the set of component placement rules may be referred to as a "modularity table." However, it will be appreciated that the set of component placement rules (e.g., the modularity table) is not limited to being defined in a table data structure. By way of non-limiting example, the set of component placement rules (e.g., the modularity table) may be defined in a table, spreadsheet, associative database, relational database, some combination thereof, or the like.

The set of component placement rules may define component placement rules for a superset of component types that may be included in a computing system. The components defined by the build specification may include a subset of the component types included in the set of component placement rules. The elevation module 304 may accordingly look up a component type of a component included in the build specification in the set of component placement rules to determine the applicable component placement rule(s) for the component type and apply the applicable component placement rules to determine a mount position for the component.

It will be appreciated that the component placement rules may include any type of rule and/or other information that may be used to determine and/or restrict a mount position for a component within a rack. In some embodiments, the component placement rules may include one or more rules for placement of a component relative to other components.

In some example embodiments, the set of component placement rules may include component dimension information that may be usable to determine whether a component may be mounted in a given mount position. For example, the component dimension information may specify the height of a component (e.g., in RUs and/or other dimensional measurements) such that the elevation module 304 may determine if there is sufficient space to accommodate a component at a given mount position in a rack (e.g., relative to the dimensional constraints of the rack and/or relative to other components that may have already been assigned mount positions in the rack). The dimension information may also include depth and/or width information for a component that may be used to determine if a component may fit in a given rack.

As a further example, the set of component placement rules may include a component stacking priority for one or more component types. The component stacking priorities may be used by the elevation module 304 to determine an order in which the elevation module 304 should determine mount positions for the components identified by the build specification. In this regard, a component type having a higher component stacking priority may be assigned a mount position before a component type having a lower component stacking priority. For example, component stacking priorities may be assigned to influence positioning of a component type in a particular location within a rack and/or to influence logical grouping of certain component types within a portion (e.g., a substantially contiguous group of mount positions) of a rack (e.g., for cabling purposes, weight distribution purposes, and/or the like). It will be appreciated that any scheme may be used to define component stacking priority values. For example, in some embodiments, numeric priority values may be assigned, with lower numeric values indicating a higher component stacking priority.

As an additional example, the set of component placement rules may define one or more build direction rules for adding subsequent components to a rack for one or more components. For example, a component type may have an associated vertical build direction rule (e.g., up or down). If the vertical build direction for a component type is "up," the component(s) of the component type may be placed beginning from the bottom most available mount position in a rack and then may be added to a next available mount position above the mount position of the previously added component. If the vertical build direction for a component type is "down," the component(s) of the component type may be placed beginning from the top most available mount position in the rack and then may be added to a next available mount position below the mount position of the previously added component.

As another example, a component type may have an associated horizontal build direction rule (e.g., right, left, or alternating) that may define rules for distributing components of a given component type across multiple racks. A horizontal build direction rule may be applied in an instance in which the build specification indicates multiple components of a component type having a horizontal build direction rule are to be included in the computing system and the components of the computing system are to be housed in multiple racks with components of the component type being split among the multiple racks. For example, if multiple components of a component type for which the horizontal build direction is specified as "right" are to be included in the computing system and there are at least two racks are being used, the elevation module 304 may place the first component of the component type in a first rack and may place the second component of the component type to the rack logically positioned to the right of the first rack (e.g., when the racks are arranged in a row and viewed from the front within the elevation plan), and so on until the right most rack is reached and/or until all components of the component type have been placed. If the right most rack is reached and there is an additional component(s) of the component type to be placed, placement of the components may restart with the first rack and continue to the rack(s) to the right of the first rack. Placement may continue in this left-to-right repeating manner until all components have been placed. The placement logic for a "left" horizontal build direction may be exactly opposite, with component placement beginning in a right most rack and continuing to a rack(s) logically placed to the left of the right-most rack and then restarting with the right most rack, if necessary, until all components of the component type have been placed. For an "alternating" horizontal build direction, components of a component type may be placed by alternating from left-to-right placement to right-to-left placement and/or vice versa with each pass across the system racks until all components of the component type have been placed. In this regard, the horizontal build direction rule may be used to force distribution of instances of a component type across racks, such as in the case of components such as power distribution units (PDUs), also referred to as power output units (POUs); switches; and other components that may be needed in each rack. A horizontal build direction rule may also be used to support power balancing of components across racks.

As a further example, the set of component placement rules may specify whether to split components of a component type among multiple racks where possible. In this regard, if a component type is specified to be split among multiple racks where possible, the elevation module 304 may be configured to distribute the components of the component type among multiple racks (provided the components of the computing system are to be housed in multiple racks) rather than stacking vertically in a single rack. For example, it may be desirable to split certain types of components (e.g., some types of network switches), among multiple racks for purposes such as to provide redundancy, distribute power load of the computing system more evenly across racks, and/or to make cabling cleaner. In some embodiments, if a component type is specified to be split among multiple racks where possible, a horizontal build direction rule for the component type may be used to determine the direction of allocation of components of the component type across racks.

As a further example, the set of component placement rules may define a maximum stacking rule for one or more component types. A maximum stacking rule may limit a number of consecutive components that can be stacked within a rack without allocating at least one open mount position (e.g., at least one RU of open space) between components within a rack. For example, an open mount position may be allocated above and/or below a set of components occupying contiguous mount positions for purposes of air flow and heat dissipation within a rack. Thus, for example, if a component type having a vertical dimension of one mount position has a maximum stacking limit of three and the quantity of the component type to be included in the computing system according to the build specification is four, the elevation module 304 may allocate an open mount position between the first of the four components and a previously placed component (if any), place three of the four components in vertically contiguous mount positions of a rack, allocate an open mount position, and then place the last of the four components of the component type in the next mount position.

As an additional example, the set of component placement rules may define a maximum placement limitation for a component type. A maximum placement limitation may be defined (e.g., in terms of a number of mount positions and/or an identifier usable to reference a particular mount position within a rack) as the highest mount position from the bottom of a rack at which the component can be mounted. For example, a component type may be restricted from being mounted higher than a certain mount position for purposes of weight distribution within a rack. In this regard, a heavier component type may be restricted from being mounted above a certain mount position to prevent the rack from being top heavy.

In some example embodiments, the set of component placement rules may define a maximum quantity rule that may limit the number of components of a component type that may be placed in a single rack. For example, due to the feasibility of cabling, air duct issues, space constraints, and/or other considerations, a limit may be placed on the number of components of a given component type that may be placed in a rack. Thus, for example, if the build specification indicates that a number of components of a component type exceeding the maximum quantity rule for the component type are to be included in the computing system, the elevation module 304 may be configured to distribute the components of the component type among multiple racks so as to satisfy the maximum quantity rule.

In some example embodiments, the set of component placement rules may define a cabinet type restriction for a component type. In this regard, some types of components may fit into some types of racks, but not into other types, such as due to mounting rail depth and/or other physical characteristics of racks. For example, some component types may only fit into a network component rack, while other component types may only fit into a server component rack, and still other component types may fit into both network component racks and server component racks. The elevation module 304 may be configured to use cabinet type restrictions for components identified in the build specification to determine the type(s) of racks needed for the computing system and/or for determining in which rack to place a component within the elevation plan.

The component placement rules of some example embodiments may provide power information for one or more component types. The power information for a component type may define a power draw, such as a maximum and/or average power draw, (e.g., in amps, Watts, and/or the like) of the component type. The elevation module 304 of some example embodiments may be configured to use power information to determine a total power draw of components assigned to a rack for purposes of enforcing any applicable limit on the maximum power draw limit of a rack and/or to balance power draw across the racks of a computing system. If placement of a component in a rack would result in the maximum power draw limit for a rack being exceeded, the component may be placed in another rack.

In some example embodiments, the component placement rules may provide thermal information for one or more component types. The thermal information for a component type may specify a thermal output, such as a maximum and/or average thermal output, (e.g., in British Thermal Units (BTUs)) of the component type. The elevation module 304 of some example embodiments may be configured to use thermal information to determine the total thermal output of components assigned to a rack for purposes of enforcing any applicable limit on the cumulative thermal output of the components in a rack. For example, in some embodiments, a maximum cumulative thermal output limit for a rack may be enforced based on a capacity of a fan/cooling system that may be used in the rack. If placement of a component in a rack would result in the maximum cumulative thermal output limit for a rack being exceeded, the component may be placed in another rack.

The component placement rules of some example embodiments may include component weight information for one or more component types. The component weight information for a component type may indicate the weight of a component, such as in pounds, stones, kilograms, and/or other unit of measurement. The elevation module 304 of some example embodiments may be configured to use component weight information to determine the total weight of components assigned to a rack for purposes of enforcing any applicable limit on the total weight of the components in a rack. If placement of a component in a rack would result in the maximum weight limit for a rack being exceeded, the component may be placed in another rack. In embodiments in which a maximum weight limit for a rack may be enforced, the maximum weight limit may be defined based at least in part on a maximum weight load that the rack may bear, an amount of weight that may be supported (e.g., in pounds/square foot and/or other similar unit of measure) by a floor in a location in which the computing system is to be deployed, and/or other factors.

FIG. 4*a* and FIG. 4*b* illustrate a portion of an example modularity table 400 defining component placement rules that may be accessed and applied by the elevation module 304 for generating an elevation plan in accordance with some example embodiments. It will be appreciated that the structure and selection of component placement rules illustrated in the modularity table 400 is provided by way of example, and not by way of limitation. In this regard, embodiments disclosed herein contemplate the use of modularity tables having an alternative structure and/or an alternative selection of component placement rules to those illustrated in FIG. 4*a* and FIG. 4*b*.

Referring to FIG. 4*a* and FIG. 4*b*, the modularity table 400 may include a column 402 listing a plurality of available component types. The component types in the column 402 may represent a set of available component types, and the build specification may identify a subset of the component types included in the modularity table 400 for inclusion in the computing system. Each component type may be associated with a set of one or more component placement rules specified in the columns 404-426.

The column 404 may specify power information for the component types. In addition to power draw information in watts and amps of the component type, the power information may include information on a type of plug used by the component type and a plug quantity of the component type, which may be used for selecting an appropriate power distribution unit (PDU) for a rack and/or determining whether a rack (e.g., a PDU contained therein) can accommodate a component.

The column 406 may specify thermal information in terms of the maximum thermal output in BTUs of each component type. The column 408 may include component weight information defining the weight of each component type in pounds (Lbs.) and/or kilograms (kgs). The column 410 may include component dimension information, which may define the height of a component type (e.g., in RUs) and/or the depth of a component type (e.g., in inches). The column 412 may include maximum placement limitations, where applicable, (e.g., in terms of a highest mount position of the rack in which the component type may be mounted). The column 414 may specify maximum stacking rules, where applicable, for the component types. The column 416 may specify maximum quantity rules, where applicable, for component types.

The column 418 may define whether components of a component type are to be split among multiple racks where possible (e.g., "split where possible"). The split where possible rule for a component type may, for example, be defined as a Boolean value (e.g., "Yes" or "No").

The column 420 may specify a cabinet type restriction for a component type. The column 422 may specify component stacking priorities assigned to the component types, with lower numeric values indicating a higher stacking priority. Columns 424 and 426 may define vertical build direction rules and horizontal build direction rules, respectively.

In some example embodiments, the elevation module 304 may be configured to prioritize the component placement rules for a component type and apply the component placement rules in the prioritized ordering when placing a component of the component type within the elevation plan. As a non-limiting example, in some embodiments, component stacking priority rules may be enforced first to determine an order in which components should be placed within an elevation plan. A split where possible rule, maximum quantity rule, vertical build direction rule, and maximum stacking rule may then be applied by the elevation module 304 in that order for a given component.

The elevation plan that may be generated by the elevation module 304 may define a respective mount position for each of a subset of the components identified by the build specification. In some example embodiments, the elevation plan may comprise a visual representation of the component mount positions within one or more racks. For example, the elevation plan may include a visual front elevation representation of the racks to be used in a computing system with an indication of component mount positions within the racks. In this regard, the mount positions of a rack may be indicated on the elevation and a mount position occupied by a component may be indicated (e.g., with shading and/or other indication) along with an indication of the component type to be mounted in the mount position.

The elevation plan may be formatted as a file that may be output and used for documentation for building the computing system. As a non-limiting example, the elevation plan may be formatted as a spreadsheet. The spreadsheet may include a plurality of cells representing respective mount positions (e.g., rack units) within each rack. A cell representing a mount position occupied by a component may include an identity of the component.

FIG. 5a and FIG. 5b illustrate an example elevation plan that may be generated in accordance with some example embodiments. The elevation plan in the example of FIG. 5a and FIG. 5b are for a computing system including three 42 RU racks. Mount positions (e.g., RUs) in which a component is mounted include an indication of the component identity. If a component occupies multiple mount positions in the rack, the mount positions occupied by the component may be grouped into a single cell. Unused mount positions units may be indicated, such as through a designated shading (e.g., as illustrated in the example of FIG. 5a and FIG. 5b) or coloring.

In some example embodiments, the elevation module 304 may be configured to assign logical designations for components in an elevation plan. In some such embodiments, the assigned logical designations may be included in the elevation plan.

In some example embodiments, one or more components included in the elevation pan may include an associated data record for store a value uniquely identifying a corresponding component used to build the computing system (e.g., the actual physical implementation of the component used for physical system build out). For example, referring back to FIG. 5a and FIG. 5b, each rack may include two columns of cells, with each pair of cells in a row being associated with a given mount position (e.g., rack unit). Cells in the left column (e.g., the column 502) may hold the component type designations if a component is mounted in a corresponding mount position. A cell in the right column (e.g., the column 504) that is associated with a mount position occupied by a component may provide the empty data record for adding the value identifying the corresponding component used to build the computing system.

The value uniquely identifying a component may, for example, be a serial number and/or other value that may be used to distinguish a given component of a component type from other components of the component type, such as may be assigned by the manufacturer of the component. When building the computing system in accordance with the elevation plan, a contract integrator may enter and/or otherwise provide the value identifying a component to a computing system, such as the computing system 300, so that the value may be added to the corresponding data record of the elevation plan. For example, in some embodiments, the contract integrator may enter the value via a keyboard/keypad and/or audibly recite the value via a microphone input, such as may be included in the user interface 322. As another example, in some embodiments, the contract integrator may use a scanner (e.g., a bar code scanner) to scan a bar code of the value, such as may be printed on a sticker that may be adhered to the component.

As previously discussed, the elevation plan may provide documentation for an individual, such as a contract integrator, building components of the computing system and/or for a post-build user of the computing system. In some example embodiments, the elevation module 304 may be configured to insert links (e.g., hyperlinks) to documentation for components in the elevation plan. The documentation may, for example, include component installation information and/or operation information. Accordingly, a user interacting with the elevation plan may access the linked documentation.

In some example embodiments, the elevation module 304 may be configured to provide an interface enabling a user to reserve one or more component mount positions for future expansion. For example, a user may specify that a number, n, of mount positions (e.g., contiguous mount positions) within a rack should be reserved for future. When generating the elevation plan, the elevation module 304 may be configured to reserve the specified number of mount positions as empty mount positions within the elevation plan. As another example, a user may reserve space for a specific component type. When generating the elevation plan, the elevation module 304 may be configured to apply component placement rules for the component type for which the user requested that space be reserved, and may reserve the required number of mount positions to accommodate the component type at a position within a rack in which the component type would be placed in accordance with the component placement rules.

FIG. 6 illustrates a flowchart according to an example method for generating an elevation plan for a computing system in accordance with some example embodiments. One or more elements of the computing system 300, such as the elevation module 304, processing circuitry 310, processor 312, memory 314, system bus 316, mass storage 318, communication interface 320, and/or the user interface 322 may, for example, provide means for performing one or more of the operations illustrated in and described with respect to FIG. 6 in accordance with some example embodiments.

Operation 600 may include accessing a build specification identifying a plurality of components to be included in a computing system. For example, the build specification may be specified by a user (e.g., via the user interface 322), accessed from a memory (e.g., memory 314, mass storage 318, and/or other entity), and/or may be accessed from another location that may be specified by a user or otherwise known to and/or determinable by the computing system 300.

Operation 610 may include accessing a set of component placement rules defining rules for placing components within a rack. Operation 620 may include generating an elevation plan defining a respective mount position for each of a subset of the plurality of components within one or more racks based at least in part on the set of component placement rules.

In some example embodiments, the elevation module 304 may be configured to provide a user interface, such as a graphical and/or command line user interface, that may enable a user to modify an elevation plan for a computing system, such as a converged infrastructure. The user interface may be displayed on a display, such as may be provided by the user interface 322. In some example embodiments, the user interface may enable a user to manually define an elevation plan for a computing system (e.g., on a component-by-component basis). Additionally or alternatively, in some example embodiments, the user interface may enable a user to modify an elevation plan that may have been automatically generated by the elevation module 304 based at least in part on a build specification and a set of component placement rules in accordance with the techniques described above.

The user interface may comprise a representation of at least a portion of an elevation plan, including visual representation of one or more racks and mount positions within the racks For example, the elevation plan may include a visual front elevation representation of one or more racks to be used in a computing system with a visual representation of the mount positions within the rack(s) and an indication of mount positions occupied by a component. For a mount position occupied by a component, the component type of the component may be indicated.

The user interface may enable a user to add and/or remove racks to the elevation plan. The user interface may also enable a user to select the size (e.g., in terms of the number of mount positions) and/or the cabinet type (e.g., network or server) of a rack included in the elevation plan.

The user interface may include one or more user interface elements enabling a user to select and/or otherwise enter a component type for a designated mount position. For example, in some embodiments, the user interface may include one or more user interface elements, such as a drop down list(s), enabling a user to select a component type from a list of available component types and add the selected component type to a designated mount position. In some such embodiments, the user interface may include a drop down list and/or other user interface element providing access to a selectable list of available component types for each mount position. A user may accordingly place a component in a desired mount position by selecting the desired component type from the component type selection user interface element associated with the desired mount position.

In some example embodiments, the user interface may be configured to enable a user to assign a logical designation to a component added to the elevation plan. For example, the user interface may include a user interface element, such as a drop down list, for a mount position enabling the user to select a logical designation from a pool of available logical designations for the component placed in the mount position. Additionally or alternatively, in some embodiments, the elevation module 304 may be configured to automatically assign a logical designation to a component added to the elevation plan by a user. The user interface may display the assigned logical designation.

FIG. 7 illustrates an example user interface 700 for modifying an elevation plan that may be generated and provided by the elevation module 304 in accordance with some example embodiments. The user interface 700 may be displayed on a display that may be provided by the user interface 322 of some example embodiments. A user may use the user interface 700 to build and/or modify an elevation plan, including, for example, an elevation plan that may be automatically generated by the elevation module 304 based at least in part on a build specification and a set of component placement rules in accordance with the techniques described above. It will be appreciated, however, that the user interface illustrated in and described with respect to FIG. 7 is provided by way of example, and not by way of limitation. In this regard, other user interface arrangements are contemplated within the scope of the disclosure.

The user interface 700 may include elements 702 enabling a user to toggle between racks included in the elevation plan. In the example of FIG. 7, there are two racks, viewable one at a time. However, it will be appreciated that in some embodiments, multiple racks may be viewed concurrently. The user interface 700 may include an element 704 enabling a user to insert an additional rack into the elevation plan. Invocation of the element 704 may, for example, result in a new rack being inserted to the right or left of the currently displayed rack within the elevation plan. If a user wishes to remove a rack from the elevation plan, the user may select the remove rack element 706.

A displayed rack in the elevation plan may display the respective mount positions (e.g., RU1-RU42) of the rack. Each mount position may include a drop down list 708 enabling a user to select from a list of available component types to place a component in the mount position. Each mount position may further include a drop down list 710 enabling a user to select from a pool of available logical addresses for assigning a logical address to a component placed in the mount position. If the user wishes to remove a component placed in a mount position, the user may do so by invoking the element 712 associated with the mount position. The user interface 700 may also enable a user to select the type(s) of POU (e.g., PDU) to include in a rack via the element 714 and to select the number of POUs to include in the rack via the element 716.

The user interface 700 may also display power information 718, which may be a total power consumption of component placed in the displayed rack. The power information 718 may, for example, be used by the user for purposes of load balancing and/or to ensure that the total component power draw does not exceed the capabilities of the POUs included in the rack.

If the user wishes to remove all components placed in a rack, the user may invoke the Clear All element 720. The user may save modifications to the elevation plan by invoking the Save element 722. If, however, the user wishes to exit the elevation plan without saving modifications to the elevation plan, the user may invoke the Cancel element 724. The user interface 700 may also include an option 726 to invoke the auto build functionality that may be performed by the elevation module 304 based at least in part on a build specification and a set of component placement rules in accordance with the techniques described above.

When a user opts to save modifications to an elevation plan, such as via invocation of the Save element 722, the elevation module 704 may be configured to generate/update an output file containing the elevation plan. The output file may be in any format that may be used for documentation for building the computing system. As a non-limiting example, the elevation plan may be formatted as a spreadsheet, such as illustrated in and described above with respect to FIG. 5a and FIG. 5b.

The elevation module 304 of some example embodiments may be configured to validate a user modification to an elevation plan made via a user interface, such as the user interface 700 and/or other user interface enabling modification of an elevation plan that may be provided by the elevation module 304. For example, the elevation module 304 may be configured to validate that a component placed by the user in a mount position in the elevation plan is mountable in the mount position. This validation may be based on one or more component placement rules. For example, the elevation module 304 may validate based on a dimension of the component (e.g., in terms of the height of the component in rack units and/or other dimension) that a sufficient amount of rack space is available to accommodate the component at the mount position. As a further example, the elevation module 304 may validate that any one or more of the component placement rules discussed above that may be considered by the elevation module 304 when generating an elevation plan based on a build specification are satisfied.

If the elevation module 304 validates that the component is mountable in the mount position selected by the user, the elevation module 304 may update the elevation plan to include the component in the mount position. However, if the elevation module 304 determines that the component is not mountable in the mount position due to non-compliance with a component placement rule, the elevation module 304 may cause display of an error indication. In some embodiments, if the elevation module 304 determines that the component is not mountable in the mount position, the elevation module 304 may cause the mount position to revert to and be displayed as an open mount position within the elevation plan.

The elevation module 304 of some example embodiments may be configured to validate a logical designation that is assigned and/or otherwise modified by a user. For example, the elevation module 304 may validate that the user has not assigned the same logical designation to multiple components in the elevation plan. The elevation module 304 may also provide a warning if a non-sequential logical designation has been assigned, such as if a first component has been assigned logical designation A and a second component has been assigned logical designation C, but logical designation B has not been assigned. If the elevation module 304 determines that a user-assigned logical designation is a valid logical designation for a component, the elevation module 304 may be configured to update the elevation plan to include a reference to the logical designation in association with the component. However, if the elevation module 304 determines that the logical designation is not valid, the elevation module 304 may be configured to cause display of an error indication and/or display the component within the elevation plan as not having an assigned logical designation.

In some example embodiments, the elevation module 304 may be configured to perform validation of a user modification to an elevation plan in response to the user making the modification. For example, validation of a mount position for a component may be performed in response to the elevation module 304 receiving an indication of the mount position for the component via the user interface, such as by selection of a component type from a drop down list 710 for a mount position in the user interface 700.

Additionally or alternatively, in some example embodiments, the elevation module 304 may be configured to perform validation of a user modification to an elevation plan in response to receipt of a command to save the modification. For example, validation may be performed on all unsaved modifications to an elevation plan made via the user interface 700 in response to the user invoking the Save element 722.

FIG. 8 illustrates a flowchart according to an example method for validating a user modification to an elevation plan in accordance with some example embodiments. One or more elements of the computing system 300, such as the elevation module 304, processing circuitry 310, processor 312, memory 314, system bus 316, mass storage 318, communication interface 320, and/or the user interface 322 may, for example, provide means for performing one or more of the operations illustrated in and described with respect to FIG. 8 in accordance with some example embodiments.

Operation 800 may include causing display of a user interface, such as the user interface 700, configured to enable user modification of an elevation plan. Operation 810 may include receiving, via the user interface, an indication of a mount position for a component. For example, the indication may comprise selection of a component type from a drop down list 710 for a mount position in the user interface 700.

Operation 820 may include validating, based at least in part on one or more component placement rules, that the component is mountable in the mount position. Operation 830 may include updating the elevation plan to include the component in the mount position in an instance in response to validation that the component is mountable in the mount position.

In some example embodiments, operations 820 and 830 may be performed in response to receiving the indication in operation 810. Additionally or alternatively, in some example embodiments, operations 820 and 830 may be performed in response to receiving a command to save modifications to the elevation plan, such as in response to the user invoking the Save element 722 in the user interface 700. In embodiments in which operations 820 and 830 may be performed in response to receiving a command to save modifications, multiple modifications that have been made by the user since the elevation plan was last save and/or that otherwise have not yet been validated may be validated.

In some example embodiments, an elevation plan may be generated by the elevation module 304 based a build specification and a static master elevation for a computing system. The static master elevation may define mount positions within one or more racks for each possible component that may be included in a computing system family. The build specification may identify a plurality of components to be included in a computing system to be built, which may represent a subset of each possible component that may be included in the computing system family. The elevation module 304 of such example embodiments may accordingly generate an elevation plan by removing components not included in the build specification from the static master elevation to generate a custom elevation plan for the computing system to be built.

The elevation module 304 may be configured in some example embodiments to perform a final build validation check of an elevation plan after the elevation plan has been completed. In some such embodiments, the elevation module 304 may be configured to perform the final build validation check for an elevation plan automatically generated by the elevation module 304 based at least in part on a build specification and a set of component placement rules (e.g., in accordance with the method of FIG. 6). Additionally or alternatively, in some such embodiments, the elevation module 304 may be configured to perform the final build validation check for an elevation plan created/modified by a user via a user interface, such as user interface 700. For example, in some embodiments in which the final build check may be performed for an elevation plan created/modified by a user, the elevation module 304 may be configured to perform the final build validation check in response to receiving, via the user interface, an indication (e.g., an invocation of the Save element 722) that the elevation plan has been completed.

The final build validation check may include a final check that the elevation plan complies with a set of one or more rules. For example, if a build specification had been provided for the computing system for which the elevation plan was created, the elevation module 304 may verify that all components included in the build specification have been placed in the elevation plan. As a further example, the elevation module 304 may verify that there are not any errors in logical identifiers assigned to components in the elevation plan.

It will be understood that each block of the flowcharts in FIGS. 6 and 8, and combinations of blocks in the flowcharts, may be implemented by various means, such as hardware and/or a computer program product comprising one or more computer readable mediums having computer readable program instructions stored thereon. For example, one or more of the procedures described herein may be embodied by computer program instructions of a computer program product. In this regard, the computer program product(s) which may embody the procedures described herein may be stored by one or more memory devices (e.g., memory 314, mass storage 318, and/or other memory device) of a computing device and executed by a processor in the computing device (e.g., processor 312 and/or other processor). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer readable memories on which the computer program instructions may be stored such that the one or more computer readable memories can cause a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowcharts is provided by way of non-limiting example in order to describe operations that may be performed in accordance some example embodiments. In this regard, it will be appreciated that the ordering of blocks and corresponding method operations illustrated in the flowcharts is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowcharts may be optional, and may be omitted.

It will be further appreciated that operations illustrated in and described with respect to the flowcharts may be automatically performed without human intervention. In this regard, various example embodiments support automated generation of an elevation plan and/or validation of user modification to an elevation plan such that generation of an elevation plan and/or validation of a user modification to an elevation plan in accordance with various embodiments may be performed without human intervention.

Functions in accordance with the above described embodiments may be carried out in many ways. In this regard, any suitable means for carrying out each of the functions described above may be employed to carry out various embodiments. In some embodiments, a suitably configured processor (e.g., processor 312) may provide all or a portion of the elements. In other embodiments, all or a portion of the elements may be configured by and operate under control of a computer program product. The computer program product for performing the methods of various embodiments of includes at least one computer readable storage medium having computer readable program code stored thereon. The computer readable medium (or media) may, for example, be embodied as and/or otherwise include the memory 314 and/or mass storage 318. However, it will be appreciated that a computer program product in accordance with various example embodiments may include any data storage device (e.g., a non-transitory computer readable storage medium) that can store data, which can be thereafter read by a computer system. Examples of the computer readable storage media include hard drives, network attached storage (NAS), read-only memory, random-access memory, one or more digital versatile disc (DVDs), one or more compact disc read only memories (CD-ROMs), one or more compact disc-recordable discs (CD-Rs), one or more compact disc-rewritable discs (CD-RWs), one or more Blu-Ray discs, magnetic tapes, flash memory, some combination thereof, and/or other optical and non-optical data storage devices. Some example embodiments may additionally or alternatively use computer readable storage media distributed over a network coupled computer system such that the computer readable code may be stored and executed in a distributed fashion.

Embodiments utilizing a computer program product and/or otherwise employing various computer-implemented operations may employ operations involving data stored in computer systems. These operations include those requiring physical manipulation of physical quantities. In some instances, though not all, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. Moreover, it will be appreciated that a non-transitory computer readable storage medium storing program instructions configured to carry out operations in accordance with one or more embodiments constitutes an article of manufacture.

The disclosed embodiments also relate to a device or an apparatus for performing these operations. The apparatus may be specially constructed to perform a particular embodiment(s), or the apparatus can be a general-purpose computer selectively activated or configured by a computer program stored in and/or otherwise accessible by the computer such that the general-purpose computer is configured to perform operations in accordance with one or more embodiments.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, minicomputers, mainframe computers and the like. Some embodiments may also be practiced in distributed computing environments where tasks are performed by remote processing devices that are linked through one or more networks, such as one or more wireline networks and/or one or more wireless networks.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A method for generating an elevation plan for a computing system comprising a plurality of components that are rack mountable in respective mount positions of one or more racks, the method comprising:

accessing a build specification for the computing system that identifies the plurality of components;

accessing a set of component placement rules defining rules for placing the plurality of components within the one or more racks;

generating an elevation plan for the computing system based on the set of component placement rules, the elevation plan including a rack diagram that is a two-dimensional elevation of the computing system, and that includes the plurality of components in the respective mount positions of the one or more racks, wherein the rack diagram is embodied in a spreadsheet, and generating the elevation plan includes formatting the spreadsheet comprising a plurality of cells representing the respective mount positions within the one or more racks;

causing display of a user interface comprising at least a portion of the rack diagram, the user interface being configured to enable user modification of the elevation plan;

receiving an indication of a mount position of the respective mount positions for a component of the plurality of components, the indication being received via user selection of the mount position on the rack diagram in the user interface; and in response to receipt of the indication of the mount position, validating, based on a component placement rule of the set of component placement rules, that the component is mountable in the mount position; and updating the elevation plan for the computing system to include the component mounted in the mount position in response to validation that the component is mountable in the mount position.

2. The method of claim 1, wherein a cell corresponding to a mount position defined by the elevation plan to be occupied by a component includes an indication of an identity of the component.

3. The method of claim 1, further comprising assigning a logical designation to each of the plurality of components, wherein the elevation plan includes the assigned logical designations.

4. The method of claim 1, wherein the set of component placement rules comprises component dimension information, and wherein generating the elevation plan comprises determining the respective mount positions for the plurality of components based at least in part on the component dimension information.

5. The method of claim 1, wherein the set of component placement rules defines a component stacking priority for each of at least one component to be included in the computing system, and wherein generating the elevation plan comprises determining the respective mount positions for the plurality of components in an order determined based at least in part on the stacking priorities.

6. The method of claim 1, wherein the set of component placement rules defines a build direction rule indicating one or more of a vertical build direction and a horizontal build direction for adding a subsequent component to the one or more racks for each of at least one component to be included in the computing system, and wherein generating the elevation plan comprises determining the respective mount positions for the plurality of components based at least in part on the build direction rules.

7. The method of claim 1, wherein the set of component placement rules defines, for each of at least one component to be included in the computing system, a maximum stacking rule limiting a number of consecutive components that can be stacked without allocating at least one rack unit of open space between components, and wherein generating the elevation plan comprises allocating an open mount position between two components, if required by a maximum stacking rule for a component included in the computing system.

8. The method of claim 1, further comprising:
determining a number of racks needed to house the plurality of components to be included in the computing system based at least in part on rack capacity and the component placement rules;
wherein generating the elevation plan comprises generating an elevation plan defining a respective mount position for each of the plurality of components within the determined number of racks.

9. The method of claim 1, wherein the elevation plan comprises, for each of at least one component of the plurality of components, an associated data record configured to store a value uniquely identifying a corresponding component used to build the computing system, or a link to component information comprising one or more of component installation instructions and component operation information.

10. A computer program product for generating an elevation plan for a computing system comprising a plurality of components that are rack mountable in respective mount positions of one or more racks, the computer program product comprising at least one non-transitory computer-readable storage medium having program instructions stored thereon, which when executed by at least one processor, cause the at least one processor to:

access a build specification for the computing system that identifies the plurality of components;
access a set of component placement rules defining rules for placing the plurality of components within the one or more racks;
generate an elevation plan for the computing system based on the set of component placement rules, the elevation plan including a rack diagram that is a two-dimensional elevation of the computing system, and that includes the plurality of components in the respective mount positions of the one or more racks, wherein the rack diagram is embodied in a spreadsheet, and the at least one processor being caused to generate the elevation plan includes being caused to format the spreadsheet comprising a plurality of cells representing the respective mount positions within the one or more racks;
cause display of a user interface comprising at least a portion of the rack diagram, the user interface being configured to enable user modification of the elevation plan;
receive an indication of a mount position of the respective mount positions for a component of the plurality of components, the indication being received via user selection of the mount position on the rack diagram in the user interface; and in response to receipt of the indication of the mount position,
validate, based on a component placement rule of the set of component placement rules, that the component is mountable in the mount position; and
update the elevation plan for the computing system to include the component mounted in the mount position in response to validation that the component is mountable in the mount position.

11. The computer program product of claim 10, wherein a cell corresponding to a mount position defined by the elevation plan to be occupied by a component includes an indication of an identity of the component.

12. The computer program product of claim 10, wherein the set of component placement rules comprises component dimension information, and wherein the at least one processor being caused to generate the elevation plan includes being caused to determine the respective mount positions for the plurality of components based at least in part on the component dimension information.

13. The computer program product of claim 10, wherein the set of component placement rules defines a component stacking priority for each of at least one component to be included in the computing system, and wherein the at least one processor being caused to generate the elevation plan includes being caused to determine the respective mount positions for the plurality of components in an order determined based at least in part on the stacking priorities.

14. The computer program product of claim 10, wherein the set of component placement rules defines a build direction rule indicating one or more of a vertical build direction and a horizontal build direction for adding a subsequent component to the one or more racks for each of at least one component to be included in the computing system, and wherein the at least one processor being caused to generate the elevation plan includes being caused to determine the respective mount positions for the plurality of components based at least in part on the build direction rules.

15. A system comprising:
at least one processor; and
at least one memory storing computer program code, wherein the at least one memory and stored computer program code are configured, with the at least one processor, to cause the system to at least:

access a build specification identifying a plurality of components to be included in a computing system comprising a plurality of components that are rack mountable in respective mount positions of one or more racks, the build specification identifying the plurality of components;

access a set of component placement rules defining rules for placing the plurality of components within the one or more racks;

generate an elevation plan for the computing system based on the set of component placement rules, the elevation plan including a rack diagram that is a two-dimensional elevation of the computing system, and that includes the plurality of components in the respective mount positions of the one or more racks, wherein the rack diagram is embodied in a spreadsheet, and the system being caused to generate the elevation plan includes being caused to format the spreadsheet comprising a plurality of cells representing the respective mount positions within the one or more racks;

cause display of a user interface comprising at least a portion of the rack diagram, the user interface being configured to enable user modification of the elevation plan;

receive an indication of a mount position of the respective mount positions for a component of the plurality of components, the indication being received via user selection of the mount position on the rack diagram in the user interface; and in response to receipt of the indication of the mount position, validate, based on a component placement rule of the set of component placement rules, that the component is mountable in the mount position; and update the elevation plan for the computing system to include the component mounted in the mount position in response to validation that the component is mountable in the mount position.

16. The computer program product of claim 10, wherein the program instructions, when executed by the at least one processor, further cause the at least one processor to:

assign a logical designation to each of the plurality of components, wherein the elevation plan includes the assigned logical designations.

17. The system of claim 15, wherein a cell corresponding to a mount position defined by the elevation plan to be occupied by a component includes an indication of an identity of the component.

18. The system of claim 15, wherein the at least one memory and stored computer program code are configured, with the at least one processor, to further cause the system to:

assign a logical designation to each of the plurality of components, wherein the elevation plan includes the assigned logical designations.

19. The method of claim 1, wherein the computing system is a converged infrastructure system, and the plurality of components of the computing system comprises one or more compute components, one or more storage components, and one or more network components.

20. The method of claim 1, further comprising:

building the computing system by a user, according to the elevation plan, and including mounting the plurality of components in the respective mount positions of the one or more racks.

* * * * *